March 9, 1954 E. G. DE CORIOLIS 2,671,718
CONTINUOUS PROCESS FOR THE MANUFACTURE OF A SUPPLEMENT GAS
Filed Dec. 23, 1948
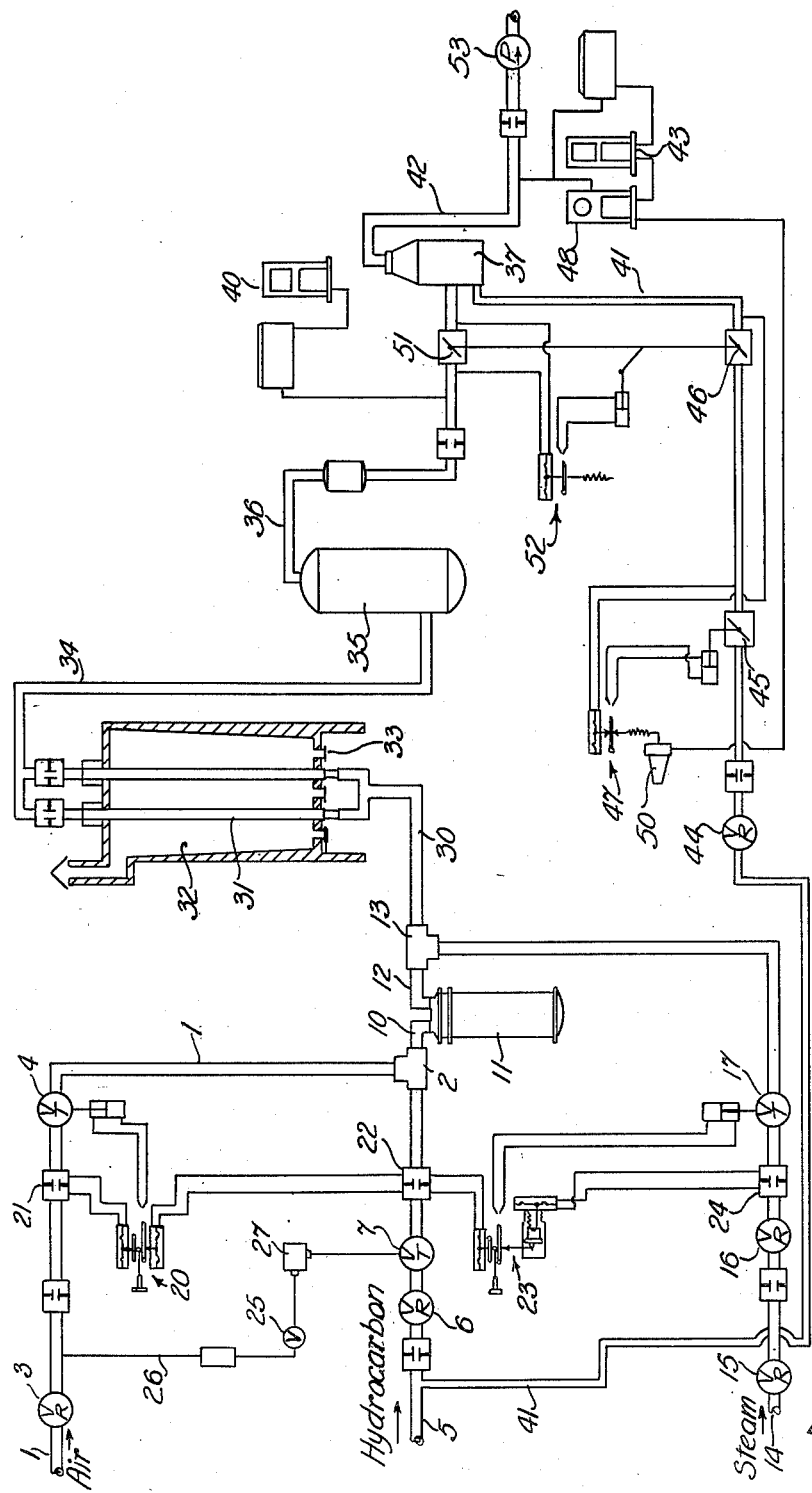
INVENTOR.
E.G. de Coriolis
By
Attorney Patented Mar. 9, 1954

2,671,718

UNITED STATES PATENT OFFICE 2,671,718

CONTINUOUS PROCESS FOR THE MANUFACTURE OF A SUPPLEMENT GAS

Ernest G. de Coriolis, Toledo, Ohio, assignor to Surface Combustion Corporation, Toledo, Ohio, a corporation of Ohio Application December 23, 1948, Serial No. 66,943

4 Claims. (Cl. 48—196)

This invention relates to a process and apparatus for the manufacture of fuel gas and more particularly to a standby process and apparatus for that purpose.

In the normal city the ordinary demand for fuel gas is substantially less than the maximum or peak load demand which may exist for short periods, usually in the winter.

The problem of devising a suitable auxiliary means for furnishing supplement gas is complicated by numerous technical and economic considerations. The supplement gas source must be reliable. The apparatus furnishing the supplement gas must be easily operated and adaptable to accurate control. The preparation of the gas must involve relatively inexpensive equipment and materials. The high degree of safety required in the fuel gas industry also complicates the problem.

One of the most important factors to be considered in devising a commercial supplement gas producer is the interchangeability of the supplement gas with the base gas, i. e., the extent to which the supplement gas may be substituted for the regular plant gas without requiring substantial adjustment or alteration of the gas consuming equipment. The interchangeability is usually expressed in per cent (by volume); so that 25 per cent interchangeable supplement gas, for example, is gas which may be used in a mixture containing 25 per cent supplement gas and 75 per cent base gas. The interchangeability is determined by such factors as the heat content and specific gravity of a gas as well as certain other difficultly predictable factors such as the combustion characteristics and the flow characteristics of the various gases in a particular mixture of gases.

Heretofore it was thought that it was not possible to prepare a 100 per cent interchangeable (i. e., completely substitutable) supplement gas without the use of prohibitively expensive equipment or materials or both. Each of the types of supplement gas prepared could be used only in certain proportions because of its limited interchangeability. Of course, the supplement gas so used must always be admixed with the base gas, ordinarily before the supplement gas is introduced into the distribution system since there is no other practical method of obtaining a complete mixture of the supplement gas and the base gas in the distribution system. Under such circumstances, the distribution system must be designed to care for the peak load demand. Thus the use of such supplement gas may aid in answering the problem relating to the design of the main gas producing units, but it offers no solution to the problem relating to the design of the distribution system.

The base gas used in the main gas plant may be natural gas or a manufactured gas. The manufactured gases used are usually carburetted water gas, coke oven gas or mixtures of carburetted water gas and coke oven gases, which have a calorific value in the range of 500–600 B. t. u. per cubic feet and a specific gravity of about 0.35–0.70 (i. e., air being 1.0).

Liquified hydrocarbons such as propane and butane have been used in certain gas burning equipment, but such hydrocarbons cannot be used as a supplement gas, because they have such a high calorific value and specific gravity (e. g., propane has approximately 2500 B. t. u. per cubic foot and 1.53 specific gravity). Such hydrocarbons may be converted to gases having lower calorific values and specific gravities by various methods such as partial combustion, thermal reformation, dilution and catalytic reformation (i. e., cracking).

Numerous reactions are known to take place when a hydrocarbon is subjected to a cracking process (i. e., reformation of the hydrocarbon at a high temperature). The products of the cracking process include various lower hydrocarbons, hydrogen, carbon and tars. Although certain reactions may be promoted selectively by catalysts, the most characteristic feature of each of these reactions is the formation of carbon deposits. Carbon formation may be tolerated in processes wherein alternate reaction and "burn out" cycles are used, but such processes are not continuous and are prohibitively expensive for use in the preparation of supplement gas.

The producer gas reaction, involving generally the reaction represented by Equation 1 (below):

(1) $$2C \text{ plus } O_2 \rightarrow 2\ CO$$

may be used to reduce the calorific value of a hydrocarbon (as well as coke) by partial combustion. If the producer gas reaction is carried to completion it yields a gas which is too high in specific gravity and too low in calorific value to be used as a supplement gas. An incomplete producer gas reaction, like the cracking reaction, is characterized by the formation of carbon and is therefore, not suitable for the preparation of supplement gas.

A supplement gas widely used at the present time in industry is a liquified petroleum-air mixture. It is well recognized that the high specific gravity of liquified petroleum-air mixtures imposes strict limitations on their use, which depend chiefly on the chemical composition and specific gravity of the base gas. Industrial experience indicates that ordinarily a butane-air mixture, for example, is limited to approximately 22 per cent interchangeability with the regular manufactured base gas.

Another method of treating hydrocarbons to produce a product gas rich in hydrogen and carbon monoxide, involves the water gas reaction. Water gas is prepared according to a reaction which may be represented by Equation 2 (below):

(2) 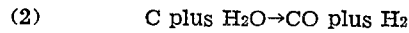

Water gas may be prepared in a state of comparative purity by the interaction of hydrocarbons with steam in the presence of a suitable catalyst. A gas substantially free from hydrocarbons may be produced by the use of a large excess of steam and a temperature higher than that required for catalytic reaction. The catalyst used may be one of the well known catalysts of the iron (Fe) or nickel (Ni) group activated with a difficultly reducible oxide of a metal (e. g., Al, Cr, or V). The hydrocarbon used is preferably one of the paraffins such as butane or propane. Gases containing a large proportion of methane or the products of a cracking process (which may contain the simple olefins) may be used. Liquid hydrocarbons which can be vaporized completely may also be treated successfully in a water gas reaction.

The calorific value of the gas resulting from the complete conversion of a hydrocarbon in the water gas reaction cannot be more than 325 B. t. u. per cubic foot, since hydrogen and carbon monoxide each have calorific values of approximately 325 B. t. u. per cubic foot. Also the specific gravity of water gas is very low. Because of its low calorific value water gas also is unsuitable as a supplement gas.

A combined process has been suggested for the preparation of a supplement gas, wherein the water gas reaction and the catalytic hydrocarbon reformation are carried out simultaneously. Such a combined process requires rather elaborate apparatus and extremely delicate control. The temperature, in particular, is difficult to control in order to avoid the formation of carbon or the production of gas which is not clean, i. e., which contains tar. Because of the difficulty in controlling the reaction a product having given characteristics cannot be obtained consistently. Also, the gas so produced has limited interchangeability with the ordinary base gas.

Thus, each of the procedures suggested for the preparation of a supplement gas by conversion of a hydrocarbon leaves something to be desired. Nevertheless, hydrocarbons are ideal materials for use in the preparation of a supplement gas. They can be easily handled industrially. They may be kept as liquids under little or no pressure, thereby insuring safe storage. A suitable process for the use of hydrocarbons in the preparation of a supplement gas would be particularly advantageous in the fuel gas industry.

The object of the present invention is to provide a relatively simple and practical continuous process for the manufacture of a 100 per cent interchangeable supplement gas.

For a consideration of what I believe to be novel and my invention, attention is directed to the following specification and the claims appended thereto.

The process of the instant invention comprises (1) admixing steam, air and hydrocarbon vapor in predetermined proportions; (2) contacting the mixture thereof with a heated catalyst to cause to proceed simultaneously producer gas and water gas reactions which are carried to substantial completion, and (3) enriching the product gas as may be required to produce a 100 per cent interchangeable supplement gas.

The accompanying drawing forming part of this specification discloses a flow diagram and schematic representation of the apparatus employed in the carrying out of the invention.

Referring to the drawing in detail, air under pressure (from a source not shown) is conducted by a pipe 1 to a mixing chamber 2 (shown as a pipe T), the air pressure being controlled by a pressure regulator 3 and the flow being controlled by a throttling valve 4. Hydrocarbon gas or vapor under pressure (from a source not shown) is conducted by a pipe 5 to said mixing chamber 2, the gas pressure being controlled by a regulating valve 6 and the flow being controlled by a throttling valve 7. A pipe 10 conducts the air-gas mixture from the mixing chamber 2 to a preheater 11 and thence by a pipe 12 to a mixing chamber 13 (shown as a pipe T). Steam from a boiler (not shown) is conducted by a pipe 14 to the second mixing chamber 13, the steam pressure being controlled by two pressure regulators 15 and 16 and the flow being controlled by a throttling valve 17. In the preheater 11, the air-gas mixture is preheated to above the condensing temperature of the steam in the mixing chamber 13.

An Askania regulator is a standard control mechanism which may be used to maintain a desired flow ratio between fluids in two pipes, the regulator comprising a diaphragm movable by differential pressure in the pipes and a jet pipe movable with the diaphragm to direct motive fluid to one side or the other of a valve operating piston.

In the instant apparatus, an Askania regulator 20 is connected across flowmeters 21 and 22 in the air line 1 and in the vapor line 5, respectively, and actuates the control valve 4 to control the air flow in response to variations in the vapor flow so as to maintain a given air to vapor ratio. Another Askania regulator 23 is connected to the flowmeter 22 in the vapor line 5 and to a flowmeter 24 in the steam line 14 and actuates the control valve 17 in response to variations in the vapor flow so as to maintain a given steam to vapor ratio.

The flow of gas or vapor in the feed line 5 is used as the primary control. In other words, the automatic controls regulate the amount of steam flow and air flow to correspond with the quantity of vapor flowing. The quantity of vapor flowing is controlled by the setting of the throttle valve 7, this setting being manually controlled from the instrument panel in the control room as by turning a knob thereon to adjust the setting of an air valve 25 in a branch line 26 from the air line 1, the valve 25 in turn controlling a prime mover 27 for moving the throttle valve 7 to the desired setting.

In operation, the air vapor and steam vapor ratios are predetermined in accordance with the desired characteristics of the product gas and the Askania regulators are set at the predetermined ratios. The vapor flow is varied in accordance with the demand for the product gas, and the Askania regulators being responsive to the variations in the vapor flow automatically maintain the predetermined ratios. Thus the valve 7 for controlling the vapor flow may be used as the control for the entire admixing operation, and, as hereinafter shown, also as the main control valve for the apparatus as a whole.

A pipe 30 conducts the air/steam/vapor mixture from the mixing chamber 13 to a bank of catalytic cracking tubes 31 arranged vertically in a furnace chamber 32 which is heated by oil or gas burners 33 at the bottom of the furnace. The cracking tubes contain a gas permeable bed of catalytic material, (not shown) the catalyst being suitable for water gas and producer gas reactions i. e., a catalyst for cracking hydrocarbons to obtain a product gas rich in hydrogen and carbon monoxide. Sufficient heat is supplied to the reactants in the cracking tubes 31 (from the furnace) to cause the water gas and producer gas reactions to proceed simultaneously and to be carried out to substantial completion. The exact amount of heat required to accomplish this, which may be readily ascertained experimentally, is determined by such factors as the specific catalyst, the specific composition of the air-steam-vapor mixture and the rate of flow of the mixture through the catalyst bed.

A pipe 34 conducts the product gas from the cracking tubes 31 to a cooler 35 where the gas is cooled by a water spray. It is a characteristic and important advantage of the instant invention that effluent water from the cooler 35 does not contain any harmful or noxious products (e. g., tar products) such as are ordinarily obtained in processes wherein it is attempted to carry out an incomplete conversion of a hydrocarbon in a water gas or a producer gas reaction. It is also a characteristic of the present invention that the cooled product gas has a predetermined calorific value and specific gravity, such that it may be admixed with a hydrocarbon vapor to obtain a supplement gas which is 100 per cent interchangeable with the regular base gas.

The instant invention involves a vapor phase reaction and may be carried out at any desired pressure which permits the reacting materials to remain in the vapor phase. A pressure slightly greater than atmospheric pressure is ordinarily the most desirable pressure from an industrial point of view and is, therefore, preferred.

The rate of flow is essentially a matter of industrial expediency. It is necessary to obtain an intimate contact between the catalyst and the reacting gases for a sufficient period of time to carry out the reactions to substantial completion, and this may ordinarily be accomplished by passing the gases through the bed of catalytic material at turbulent flow rates, and temperatures substantially higher than those absolutely necessary to cause the reaction to take place.

The temperatures used in the instant process are dependent upon such a factor as the rate of flow. Ordinarily the temperature must be increased if the rate of flow is increased in order to continue to carry the reactions to substantial completion.

Any of the aforementioned hydrocarbons which are used in the ordinary water gas reaction may be used in the practice of the instant invention. Such hydrocarbons include those having the formula $C_nH_{2n+2}$ wherein $n$ is an integer from 1 to 7, i. e., methane, ethane, propane, butane, pentane, hexane and heptane. Also olefinic hydrocarbons may be used. For example, the hydrocarbons having the formula $C_nH_{2n}$ wherein $n$ is an integer from 2 to 7 may be used to replace as much as 50 per cent by volume of the foregoing hydrocarbons having the formula $C_nH_{2n+2}$ in the catalytic cracking process. The selection of a particular hydrocarbon may also determine certain operating conditions that are required. The preferred hydrocarbons for use in the instant invention are propane and butane i. e., a hydrocarbon having the formula $C_nH_{2n+2}$ wherein $n$ is 3 or 4. Such hydrocarbons are often available commercially in a gas mixture which also contains a substantial proportion of other hydrocarbons such as propylene and ethane.

The exact operating conditions required to obtain a desired product by carrying out a process embodying the invention can be readily determined experimentally. For example, the preparation of a gas having a calorific value of 230 B. t. u. and a specific gravity of 0.55 may be demonstrated by carrying out the following procedure (using the apparatus described in the drawing).

Air at a rate of 17,000 cubic feet per hour and propane vapor at a rate of 4800 cubic feet per hour are fed into the mixing chamber 2. (As used herein the term "cubic feet" means cubic feet measured at standard conditions at 30 in. Hg pressure and 60° F. temperature.) The unit is operated under a pressure of 5–25 pounds per square inch, and the air/vapor mixture is heated in the preheater 11 to about 300° F. The preheated air/vapor mixture is admixed with steam (250°–280° F.) at a rate of 730 pounds per hour in the second mixing chamber 13. The air/steam/vapor mixture is then fed into the cracking tubes 31. These cracking tubes will ordinarily consist of a bank of eight metal tubes, each about six inches in diameter and twenty-six feet long, the tubes being made of chrome-nickel alloy. The catalyst bed in each of the tubes fills about nineteen feet of the tube, in the "hot" region of the furnace 32, and the tube is filled with small pieces of refractory rock above and below the catalyst bed. The catalyst bed will ordinarily consist of ¾ inch refractory cubes impregnated with a nickel oxide catalyst. The average temperatures maintained in the furnace 32 are 1825° F. at the bottom, 1775° F. in the middle and 1750° F. at the top. While passing from the cracking tubes to the cooler 35 the gas will ordinarily cool down to approximately 350° F. In the cooler 35 the gas will be further cooled to about 70° F. The final product gas (which is obtained at a rate of about 55,000 cubic feet per hour) has the following composition:

| | Per cent |
|---|---|
| Carbon dioxide ($CO_2$) | 4.6 |
| Carbon monoxide (CO) | 21.1 |
| Hydrogen ($H_2$) | 46.3 |
| Methane ($CH_4$) | 2.3 |
| Nitrogen ($N_2$) | 25.7 |
| Total | 100.0 |

As used herein, the terms "per cent" and "%" mean per cent by volume.

The instant invention, as shown in the foregoing demonstration, involves the following reactions: (a) the producer gas reaction which is exothermic and quite rapid, Equation 3 below:

(3) $C_3H_8$ plus 1.5 $O_2$ plus 5.65 $N_2 \rightarrow$
  3 CO plus 4 $H_2$ plus 5.65 $N_2$ assuming that air is 21 per cent $O_2$ and 79 per cent $N_2$, and (b) the water gas reaction which is endothermic and substantially slower than the producer gas reaction, Equation 4 below:

(4)　　$C_3H_8$ plus $3\ H_2O \to 3\ CO$ plus $7\ H_2$

It has been found that the partial conversion of a hydrocarbon in either the water gas or the producer gas reaction is commercially unacceptable as a gas producing process because of the inevitable formation of carbon which takes place in carrying out such a process. It is possible that carbon may be an intermediate product in either the water gas or the producer gas reaction, but it is believed that the carbon formation is caused chiefly by thermal cracking which is known to take place also at temperatures employed for the water gas and producer gas reactions. In the foregoing demonstration, the presence of methane ($CH_4$) in the final product is evidence that some thermal cracking as distinguished from catalytic cracking has taken place. The water gas and producer gas reactions take place with carbon alone (Equations 1 and 2 above) as well as with a hydrocarbon (Equations 3 and 4 above). Thus no carbon is deposited on the catalyst, for example, during a continuous process involving the conversion of a hydrocarbon by simultaneous water gas and producer gas reactions which are being carried to completion. The exact determination as to when the reactions are carried to completion is indicated by the methane ($CH_4$) content of the final product gas. If the methane content exceeds 8 per cent, excessive carbon deposition on the catalyst usually results. In the practice of the invention it has been found that the reactions are being carried to substantial completion if the methane content of the final product is less than 3 to 4 per cent, and under such conditions the carbon formation is not appreciable from an industrial point of view. It is preferable to operate under such conditions that the methane content in the converted gas product is about 1 per cent It has been found that certain calculated operating relationships are particularly useful from an industrial point of view as factors to be considered in controlling the instant process. One of the important factors to be considered is the expansion, i. e., the ratio of the cubic feet per hour of converted gas to the cubic feet per hour of hydrocarbon vapor used. For example, in the foregoing demonstration the expansion is 55,000/4800=11.4. The expansion is a particularly useful factor in that it is an indication of the extent to which the hydrocarbon is converted, and, therefore, an indication of the efficiency of the process. If the hydrocarbon used is propane, ordinarily it is commercially practical to operate under conditions whereby the expansion is at least above 7.9 and preferably in the range of 8.0 to 11.5. If a higher hydrocarbon, for example butane, is used, the practical range for the expansion would be correspondingly higher.

Another important factor to be considered is the space velocity, i. e., the cubic feet of hydrocarbon vapor used per hour per cubic foot of apparent catalyst volume. In the foregoing demonstration the space velocity is

4800/27.4=175

The space velocity indicates the amount of work being done by the catalyst, and as such the space velocity may be used to determine experimentally the conditions necessary for optimum catalyst efficiency. The composition of the converted gas gives the best indication of the desired space velocity. If the space velocity is too high, it may not be possible to carry out the reactions to substantial completion, i. e., to obtain a converted gas having a sufficiently low methane content. Ordinarily it is not commercially practical to operate at a space velocity sufficiently low to permit equilibrium conditions to exist in the catalyst bed, and the fact that equilibrium conditions are not obtained in the foregoing demonstration is indicated by the presence of methane in the converted gas. At the optimum space velocity the proportions of methane and carbon dioxide are about equal in the converted gas. As a rule, increases in space velocity result in decreases in expansion, other conditions remaining the same, but it is possible to increase the space velocity without decreasing the expansion, for example, by increasing the catalyst temperature also. The optimum space velocity for a given hydrocarbon depends upon the catalyst temperature as well as the amounts of air and steam used.

Still another factor, which is an important consideration in controlling the process, is the air/vapor ratio, i. e., the ratio of the cubic feet per hour of air used to the cubic feet per hour of hydrocarbon vapor used. The air/vapor ratio used in the foregoing demonstration is 17,000/4800=3.54

By the use of a given air/vapor ratio a known amount of nitrogen is incorporated in the converted gas product. An increase in the air/vapor ratio causes the specific gravity of the converted gas to increase. An increase in the air/vapor ratio causes the calorific value of the converted gas to decrease approximately in an inverse proportion to the amount of nitrogen so added, since the admixture of nitrogen simply dilutes the concentration of carbon monoxide and hydrogen (which have about equal calorific values). Thus it can be seen that under the preferred operating conditions, the air/vapor ratio is the principal factor to be considered in converting the hydrocarbon to a gas of given calorific value and specific gravity. Also, the air/vapor ratio is useful in determining the proportion of hydrogen obtained in the converted gas, and the proportion of hydrogen influences appreciably the rate of burning of a fuel gas.

The air/vapor ratio used in the practice of the invention is predetermined in accordance with the desired characteristics of the resulting product gas. Thus if it is desired to produce an extremely low density product gas, little or no air (e. g., an air/vapor ratio of 0.05–0.10) is used, and a product gas having a specific gravity as low as 0.35 may be obtained. Such a product gas may be enriched with hydrocarbon vapor to obtain a supplement gas for natural gas, which has a calorific value of about 1000 B. t. u. per cubic foot and a specific gravity of about 0.62. On the other hand, if it is desired to produce a high density product gas, a very high proportion of air (e. g., an air/vapor ratio of about 6) is used, and the resulting product gas may have a calorific value of about 190 B. t. u. per cubic foot and a specific gravity of about 0.70.

Still another important factor is the steam/vapor ratio, i. e., the ratio of the cubic feet per hour of steam used to the cubic feet per hour of hydrocarbon vapor used. It is assumed for the purpose of definition that at standard conditions steam is gaseous. Thus, in the foregoing demonstration the steam/vapor ratio is $$730/18 \times 378/4800 = 3.20$$

The steam/vapor ratio is dependent upon the air/vapor ratio to the extent that there must be a sufficient total quantity of oxygen present in the air and steam to carry out the conversion of the hydrocarbon to substantial completion. Thus if the air/vapor ratio is extremely low the steam/vapor ratio is correspondingly high in order to effect substantially complete conversion of the hydrocarbon. One of the main functions of steam in the process is believed to be the reduction of carbon formation, and ordinarily the minimum steam/vapor ratio for any given set of conditions is that ratio necessary to reduce the methane to a minimum in the converted gas. The optimum steam/vapor ratio is dependent upon the particular operating conditions involved, since the amount of steam required to obtain a minimum methane content in the converted gas may be reduced appreciably, for example, by the use of a higher air/vapor ratio or higher furnace temperatures.

One of the outstanding aspects of the instant invention is the flexibility of the operation. Gases of various desired characteristics may be obtained simply by the use of various predetermined air/vapor and steam/vapor ratios; and varying quantities of a gas of given characteristics may be obtained simply by increasing or decreasing the input to the unit while maintaining constant the predetermined air/vapor and steam/vapor ratios. Moreover, the flexibility of the operation is very simply controlled since the air/vapor and steam-vapor ratios can be varied by varying the settings of the Askania regulators, and with the Askania regulators at given settings the changes in production of the unit may be made simply by changing a single valve, namely, the valve controlling the vapor flow. It is apparent that the Askania regulators can be connected in the unit to control the flow of any two of the constituents (air, steam and vapor) so as to maintain the flow of these two constituents in predetermined ratios with the third constituent whose flow is independently controlled. As shown in the drawing, it is preferable to control the entire unit by controlling the flow of the vapor.

The furnace temperatures are considered to give a good indication of the catalyst temperatures, although the exact temperature of the catalyst at a given point is influenced by several factors. Heat is supplied to the catalyst by the furnace and by the (exothermic) producer gas reaction, and heat is removed from the catalyst by the (endothermic) water gas reaction. If the catalyst temperature is too low carbon deposits on the catalyst, and the minimum furnace temperature which may be employed under given operating conditions is that temperature at which the carbon deposit on the catalyst is not appreciable industrially. The minimum permissible furnace temperature depends upon the other operating conditions, but for usual operating conditions the minimum temperature is about 1750 deg. F. and the maximum temperature is the maximum the equipment can stand (i. e., about 2300 deg. F.). It is preferable to operate at temperatures substantially higher than the minimum permissible temperature, and ordinarily furnace temperatures of about 1850 deg. F. give optimum results. The temperatures at the top, middle and bottom of the furnace are observed, but the temperature at the middle is used as the control temperature. The temperature of the catalyst in the tubes is of course substantially (perhaps 200 deg. F.) less than the furnace temperature in the adjacent area.

The character of the reactions involved in the instant invention and the effects of various changes in operating conditions may be demonstrated by an examination of the results obtained by carrying out procedures substantially the same as the foregoing demonstration except that different quantities of the air, steam and vapor are used. Table 1 (below) compares the various properties of the gas products obtained with the product obtained in the foregoing demonstration and more specifically describes the feed rates and operating conditions employed by specifying the feed rate of hydrocarbon vapor in thousands of cubic feet per hour (line 2), the feed rate of air in thousands of cubic feet per hour (line 3), the feed rate of steam in pounds per hour (line 4), the space velocity (line 5), the expansion (line 6), the air/vapor ratio (line 7), the steam/vapor ratio (line 8), and the furnace temperatures at the top (line 9), the middle (line 10) and the bottom (line 11) of the furnace.

In Table 1, the data relating to each converted gas product are specified as the rate at which the product is obtained in thousands of cubic feet per hour (line 12), the calorific value of the product in B. t. u. per cubic foot (line 13) and the specific gravity of the product (line 14). The composition of the converted gas product is given as the carbon dioxide ($CO_2$) in per cent (line 15), the carbon monoxide (CO) in per cent (line 16), the hydrogen ($H_2$) in per cent (line 17), the methane ($CH_4$) in per cent (line 18), and the nitrogen ($N_2$) in per cent (line 19).

*Table 1*

| 1. Test Run No | 1A | 1B | 1C |
|---|---|---|---|
| 2. Feed Rate: Vapor (MCF/hr.) | 4.80 | 5.12 | 4.95 |
| 3. air (MCF/hr.) | 17.00 | 2.57 | 29.45 |
| 4. steam (pounds/hr.) | 730 | 1,530 | 215 |
| 5. Conditions: Space velocity | 175 | 187 | 180 |
| 6. expansion | 11.4 | 8.1 | 12.4 |
| 7. air-vapor ratio | 3.54 | 0.50 | 5.95 |
| 8. steam/vapor ratio | 3.20 | 6.3 | 0.92 |
| 9. Furnace temp.—at top (deg. F.) | 1,745 | 1,765 | 1,770 |
| 10. at middle (deg. F.) | 1,800 | 1,800 | 1,800 |
| 11. at bottom (deg. F.) | 1,875 | 1,870 | 1,830 |
| 12. Product: (MCF/hr.) | 55.00 | 41.4 | 61.20 |
| 13. calorific value | 230 | 347 | 190 |
| 14. specific gravity | 0.55 | 0.43 | 0.65 |
| 15. Composition: $CO_2$ | 4.6 | 5.0 | 2.0 |
| 16. CO | 21.1 | 23.1 | 23.0 |
| 17. $H_2$ | 46.3 | 59.0 | 33.8 |
| 18. $CH_4$ | 2.3 | 8.0 | 1.0 |
| 19. $N_2$ | 25.7 | 4.9 | 40.2 |

From Table 1 it can be seen that by increasing the air/vapor ratio (line 7) the calorific value (line 13) of the converted gas product is decreased, and the specific gravity (line 14) is increased. Also, by increasing the air/vapor ratio (line 7) the proportion of hydrogen (line 17) in the converted gas product is decreased.

From the variety of properties of the converted gas obtained in the foregoing tests, it can be seen that the various operating conditions, and particularly the air/vapor ratio and steam/vapor ratios, may be varied to produce selectively converted gas products having the desired properties.

As hereinbefore mentioned one of the main features of the instant invention resides in the fact that a 100 per cent interchangeable supplement gas may be obtained by admixing, in predetermined proportions, hydrocarbon vapor, i. e., hydrocarbons such as propane, butane, pentane, hexane, heptane and the simple olefins with the converted gas obtained by the continuous process which comprises (1) preliminarily admixing steam, air and hydrocarbon vapor in predetermined proportions and (2) contacting the mixture thereof with a heated catalyst to cause to proceed simultaneously producer gas and water gas reactions which are carried to substantial completion.

Referring again to the drawing, a pipe 36 conducts the product gas from the cooler 35 to a mixing chamber 37. A calorimeter 40 connected to the pipe 36 records the calorific value of the product gas. Hydrocarbon vapor, as an enriching gas supplied from a storage source (in the present process from the vapor line 5) is conducted at a controlled rate by a pipe 41 to the mixing chamber 37 and there admixed with the product gas to produce a supplement gas which passes out of the mixing chamber through a pipe 42. An instrument 43 connected to the pipe 42 records the calorific value of the supplement gas and another instrument 48 is adapted to transmit signals based on changes of said value.

The characteristics of any particular enriching vapor which may be used in the practice of the invention are known constants; whereas the characteristics of the catalytically cracked product gas may be varied. It is of particular advantage that the characteristics of the product gas of the instant invention can be predetermined and that gas having desired characteristics may be produced continuously and at varying rates. Since gas having desired characteristics can be produced continuously, it is not necessary to employ an intermediate storage system for the product gas (so that the correct amount of enriching vapor to be admixed may be calculated after the characteristics of the product gas are determined). Instead, the characteristics of the product gas being predetermined, the proportion at which the enriching vapor is to be admixed is likewise predetermined.

The product gas flows into the mixing chamber 37 at the rate at which it is produced, and the enriching vapor flows into the same mixing chamber 37 at a controlled rate so as to obtain a supplement gas having the desired characteristics. Thus, under carefully controlled conditions, it is possible to set a control mechanism, such as an Askania regulator, so as to maintain a constant product gas/enriching vapor ratio of predetermined value and thereby automatically control the enriching vapor flow. Under ordinary conditions it is not practical to attempt to operate under perfect control and certain small variations in the control are permitted. In the instant process, it has been found that fairly accurate control may be obtained by employing a main control means to maintain a substantially constant product gas/enriching vapor ratio, and extremely accurate control may be obtained by the use of an auxiliary means for constantly making slight corrections in the ratio which is being maintained by the main control means. The main control means is preferably responsive to variations in the flow rate of the product gas into the mixing chamber. The auxiliary means may be responsive to variations in any given characteristic such as the specific gravity or the calorific content of either the product gas or the resulting supplement gas. In industry, the calorific value of fuel gas usually has the most rigid specifications and, therefore it is preferable to employ an auxiliary means responsive to the variations in the calorific value of the supplement gas.

In the present invention, the pressure of the enriching gas or vapor in the feed line 41 is controlled by a pressure regulator 44 and the flow thereof is controlled by two throttling valves 45 and 46. The first valve 45 is controlled by an Askania regulator 47 which is responsive to changes in line pressure at the upstream and down stream sides of the second valve 46. Micro adjustment of the first valve 45 in accordance with changes in the calorific value of the supplement gas is automatically effected by signals from the instrument 48 to an instrument 50 which operates to bias the operation of the Askania regulator 47 in one direction or the other as conditions may require. The valve 46 is a damper type valve connected mechanically to another damper type valve 51 in the product-gas pipe 36. In substance, the valve 46 in a given position provides an opening of a given area through which vapor may pass and the valve 51 in a given position provides an opening of a given area through which product gas may pass. The valve 46 and the valve 51, being mechanically connected to each other, cooperate to maintain a fixed ratio between the two areas just mentioned. An Askania regulator 52 connected to the pipe 36 across the valve 51 actuates the valve 51 towards open or closed position to maintain a given pressure drop across the valve 51 and in so doing moves the valve 46 accordingly. Thus, the Askania regulator 52 in response to variations in the product gas flow rate in the pipe 36, as evidenced by the variations in pressure drop across the valve 51, controls automatically the valve 46, and thereby controls the rate of flow of enriching vapor in the pipe 41; hence the regulator 52 maintains a product gas/enriching vapor flow ratio which would be constant if the fluid pressure exerted against the damper 51 were the same as that exerted against the valve 46. By changing the fluid pressure against the valve 46, it is possible to make corrections or changes in the ratio, and in actual practice it is possible to obtain a very delicate control of the vapor flow rate in the pipe 41 by controlling the vapor pressure against the valve 46 through the use of the control valve 45. Thus a given product gas/enriching gas ratio is maintained approximately by controlling the valve 46, and delicate modifications are made through the operation of the control valve 45 so as to obtain a supplement gas whose calorific value is very accurately controlled. In other words, the enriching gas flow control mechanism comprises an automatic control (damper valve 46) responsive to variations in the quantity of product gas for maintaining an established product gas/enriching vapor ratio and a second, independent control (valve 45) responsive to the calorific content of the supplement gas for compensatively varying the established ratio.

The pipe line 42 leading from the mixing chamber 37 conducts the finished supplement gas to the main distributing header (not shown) of the gas distributing system—through a pump 53.

In the present invention a supplement gas having predetermined properties is obtained by admixing, in predetermined proportions, propane, butane or other light hydrocarbons with a converted gas of predetermined properties obtained by the method hereinbefore described. The predetermined properties of the converted gas which are desired may be calculated on the basis of properties desired in the supplement gas. For example, if a supplement gas having 540 B. t. u. per cubic foot calorific value and 0.68 specific gravity is desired, an equation representing the approximate relationship of the corresponding properties desired in a converted gas which may be admixed with propane is calculated as follows:

(a) The proportion ($x$) of converted gas to be admixed with propane may be expressed in terms of the calorific value ($V$) of the converted gas as follows:

$$xV \text{ plus } 2550(1-x) = 540$$
$$x = \frac{2010}{2550 - V}$$

(b) The proportion ($x$) of converted gas to be admixed with propane may be expressed in terms of the specific gravity ($D$) of the converted gas as follows:

$$xD \text{ plus } 1.53(1-x) = 0.68$$
$$x = \frac{0.85}{1.53 - D}$$

(c) An equation for the approximate relation between the calorific value ($V$) and the specific gravity ($D$) may be obtained as follows:

$$\frac{2010}{2550 - V} = x = \frac{0.85}{1.53 - D}$$

$$V = \frac{2010D - 907.8}{0.85}$$

Table 2 (below) shows the various properties of the supplement gas obtained as described, and more specifically describes the process conditions by specifying the test run from which the converted gas is obtained (line 1), the flow rate in thousands of cubic feet per hour (MCF/hr.) of the converted gas into the mixer (line 2), the flow rate in thousands of cubic feet per hour (MCF/hr.) of propane into the mixer (line 3), the calorific value of the supplement gas in B. t. u. per cubic foot (line 4), and the specific gravity of the supplement gas (line 5). The composition of the supplement gas is given as the carbon dioxide ($CO_2$) in per cent (line 6), the carbon monoxide (CO) in per cent (line 7), the hydrogen ($H_2$) in per cent (line 8), the methane ($CH_4$) in per cent (line 9), the propane ($C_3H_8$) in per cent (line 10) and the nitrogen ($N_2$) in per cent (line 11).

*Table 2*

| 1. Test Run No. | 1A | 1B | 1C |
|---|---|---|---|
| 2. Flow Rate: Converted gas (MCF/hr.) | 55 | 41.4 | 61.20 |
| 3. Propane (MCF/hr.) | 9.00 | 4.45 | 11.10 |
| 4. Supplement gas: calorific value | 539 | 540 | 540 |
| 5. specific gravity | 0.70 | 0.53 | 0.80 |
| 6. Composition: $CO_2$ | 3.9 | 4.5 | 1.7 |
| 7. CO | 18.1 | 20.9 | 19.5 |
| 8. $H_2$ | 39.8 | 53.2 | 28.6 |
| 9. $CH_4$ | 2.0 | 7.2 | 0.8 |
| 10. $C_3H_8$ | 14.1 | 9.7 | 15.3 |
| 11. $N_2$ | 22.1 | 4.5 | 34.1 |

From Table 2, it can be seen that gases having the same calorific value but substantially different specific gravities may be obtained in the practice of the invention. The preparation of supplement gases having almost identical calorific values but having substantially different compositions, demonstrates the flexibility of the instant invention. By altering the composition of a gas it is possible to alter such properties as the combustion characteristics. The preparation of a 100 per cent interchangeable supplement gas amounts to a substantial duplication of the calorific value and combustion characteristics of the base gas. It is understood that such characteristics as the calorific value, the specific gravity and the hydrogen content cooperate to determine the combustion characteristics, but the part each plays in determining the combustion characteristics is not fully understood. It so happens that the flexibility of the instant invention is such that a supplement gas may be produced having the necessary combination of calorific value, specific gravity and hydrogen content to permit such gas to be 100 per cent interchangeable with any given base gas selected from the known industrial fuel gases. It is this fundamental discovery coupled with the discovery of commercially acceptable means for continuously producing the gas under accurately controlled conditions that makes the instant invention revolutionary in the fuel gas art.

What is claimed as new is:

1. A continuous process for the manufacture of a supplement gas which comprises (1) mixing a hydrocarbon vapor with air and steam in proportions such that the total oxygen content of the air and steam is at least sufficient to form carbon monoxide with all of the carbon in the hydrocarbon vapor, (2) converting the resulting mixture to a producer gas-water gas mixture, in the presence of an externally heated catalyst, by carrying the producer gas and water gas reactions substantially to completion so that the methane content of the product is not more than about 8 volume per cent and the calorific value of the product is not more than about 347 B. t. u. per cubic foot, and (3) mixing said product with a hydrocarbon vapor in such proportions as to produce a supplement gas of the desired calorific value and specific gravity.

2. A continuous process as claimed in claim 1 wherein the hydrocarbon vapor used in step (1) is propane.

3. A continuous process as claimed in claim 2 wherein the volume of air used in step (1) is from .05 to 6 times the volume of hydrocarbon vapor used in step (1).

4. A continuous process as claimed in claim 1 wherein the methane content of the product of step (2) is not more than about 4 volume per cent.

ERNEST G. DE CORIOLIS.

References Cited in the file of this patent
UNITED STATES PATENTS

| Number | Name | Date |
|---|---|---|
| 1,738,620 | Umpleby | Dec. 10, 1929 |
| 1,843,063 | Burke | Jan. 26, 1932 |
| 1,918,254 | Faber | July 18, 1933 |
| 1,927,493 | Hechenbleikner | Sept. 19, 1933 |
| 1,972,898 | Odell | Sept. 11, 1934 |
| 1,992,909 | Davis | Feb. 26, 1935 |
| 2,047,499 | Towne | July 14, 1936 |
| 2,172,106 | Parker | Sept. 5, 1939 |
| 2,193,240 | Schmidt | Mar. 12, 1940 |
| 2,432,543 | Prickett | Dec. 16, 1947 |
| 2,568,351 | Milbourne | Sept. 18, 1951 |